Jan. 26, 1971          W. KREY          3,558,364
LEAK-PROOF GALVANIC CELL EMPLOYING GRANULAR ANION
EXCHANGE COMPOUND SEPARATOR
Filed Oct. 16, 1969
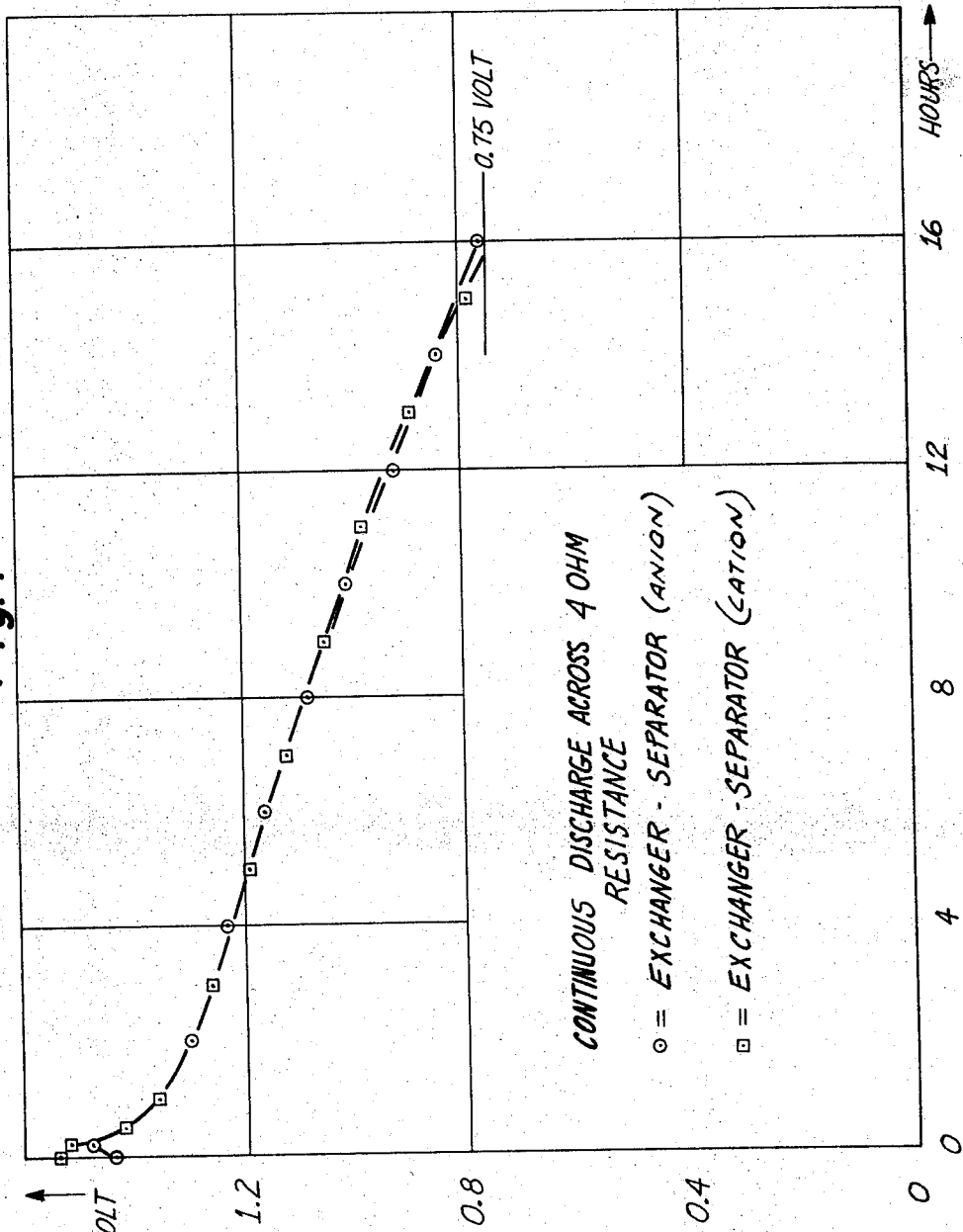
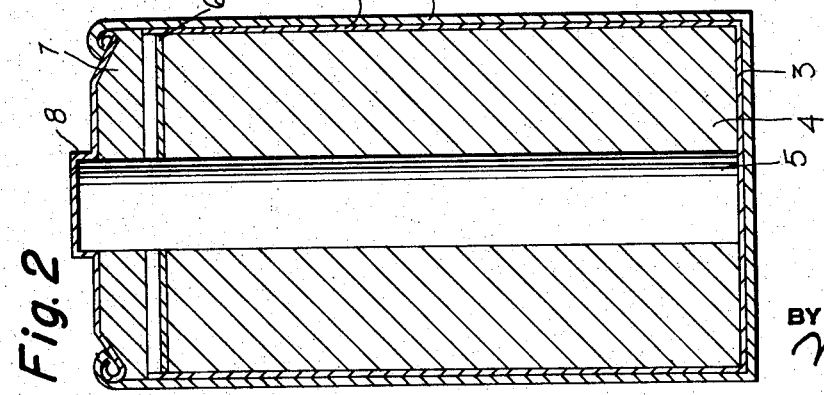
INVENTOR
WINFRIED KREY
BY
*Michael S. Striker*
ATTORNEY United States Patent Office 3,558,364
Patented Jan. 26, 1971

3,558,364
LEAK-PROOF GALVANIC CELL EMPLOYING GRANULAR ANION EXCHANGE COMPOUND SEPARATOR
Winfried Krey, Neunheim, Germany, assignor to Varta Gesellschaft mit beschrankter Haftung, Ellwangen (Jagst), Germany
Continuation-in-part of application Ser. No. 676,499, Oct. 19, 1967. This application Oct. 16, 1969, Ser. No. 866,883
Claims priority, application Germany, Oct. 16, 1968, P 18 03 302.8
Int. Cl. H01m 21/00, 3/00
U.S. Cl. 136—83                        12 Claims

ABSTRACT OF THE DISCLOSURE

A leak-proof electric cell is formed by arranging a separator layer consisting of a granular swellable anion exchange compound or a mixture of such anion and cation exchange compounds between the negative electrode and the depolarizer of the cell.

The cell is made by applying a suspension of the anion exchange compound in a solution of a binding agent to the inner wall of a cup-shaped metal electrode, preferably a zinc cup electrode and then removing the solvent so as to leave a uniform film on the inner wall of the electrode cup.

CROSS-REFERENCES TO RELATED APPLICATIONS

The present application is a continuation-in-part of application Ser. No. 676,499, now abandoned, filed by the same inventor for an invention of the same title on Oct. 19, 1967.

BACKGROUND OF THE INVENTION

Leak-proof electric cells with a weakly acidic thickened electrolyte such as are used in elements of the Leclanche type have the undesirable property that during the discharge a rise of the electrolyte frequently occurs. This may result in leakage of electrolyte from the element and thus may lead to damage to surrounding apparatus parts.

It appears that the cause of this phenomenon is the high differential in the transport numbers of cations and anions of the electro-chemical reaction products. The transport number of zinc for instance in a primary cell having a zinc chloride type electrolyte is comparatively low as compared with the transport number of the chloride. As a result thereof it occurs that the zinc ions which during the discharge emanate from the negative zinc electrode remain in the immediately proximity of the zinc electrode. Their charge is compensated, following the trend towards electroneutrality, by the entry of anions with high transport number. Thus, eventually a zone of higher salt concentration will form at the place involved.

As a further consequence it has been found that the speedy equalization of concentrations is strongly obstructed wherever the element uses one of the conventional thickening agents, for instance starch, flour, methylcellulose, carboxymethylcellulose, karaya gum, gelatine, agar agar, pectin, alginate, etc. Considerable osmotic pressure differences thus arise which finally result in a volume increase of the concentrated electrolyte solution. The concentration differential which occurs during the discharge can then be offset only by diffusion. However, the water which is used as solvent diffuses at a substantially higher rate than the dissolved electrolyte salt. Thus, the frequently observed rise of the electrolyte solution occurs in direct neighborhood of the zinc electrode and brings about the leaking of the element since a backflow of the electrolyte solution into the pressed body of the depolarizer is strongly obstructed by the conventional thickening agent.

The objective therefore arises to form a leakproof galvanic element with a thickening agent which is able to bind a sufficient amount of electrolyte and at the same time to increase the mobility of the cations and to reduce that of the anions and thus to prevent a rising of the electrolyte directly at the negative electrode.

In the above-referred-to earlier application of the inventor it has been proposed to form a separator layer for this kind of electrolytic cell which consists of or includes a granular highly swellable cation exchange compound. These cation exchange compounds magnify the transport (transference) number of the cations and thus have a beneficial effect. It was assumed that this action was peculiar to cation exchange materials which in addition had to have the necessary swelling capacity. Surprisingly, it has now been found that anion exchange compounds with good swelling properties can also be used for this purpose. As will be pointed out below, the use of anion exchange compounds would be desirable in certain circumstances for various reasons.

SUMMARY OF THE INVENTION

The invention accordingly is directed to a leakproof electric cell which comprises a positive electrode, a negative electrode, a depolarizer and a separator layer disposed between the negative electrode and the depolarizer wherein the separator layer comprises granules of at least one swellable anion exchange compound and may also consist of a mixture of granular swellable anion and cation exchange compounds.

The invention furthermore embraces a method of forming this type of leak-proof electric cell by applying a suspension of an anion exchange compound or a mixture of anion and cation exchange compounds in a solution of a binding agent to the inner wall of a cup-shaped metal electrode followed by removal of the solvent so as to form an even film in the form of said separator layer on the inner wall of the electrode.

The novel features which are considered as characteristic for the invention are set forth in particular in the appended claims. The invention itself, however, both as to its construction and its method of operation will be best understood from the following description of specific embodiments when read in connection with the accompanying drawing.

BRIEF DESCRIPTION OF THE DRAWING

FIG. 1 illustrates the voltage values obtained with an anion exchange compound as separator layer in comparison to the same values obtained with a cation exchange compound, in both cases the discharge being continuous at a resistance of 4 ohms. The voltage values have been plotted in the drawing against the time expressed in hours;

FIG. 2 is a schematic, elevational, cross-sectional view of a leak-proof electric cell according to the present invention.

DESCRIPTION OF THE PREFERRED EMBODIMENTS

As stated, the invention solves the problem presented in this type of electric cell by replacing the conventional thickener with a separator layer which either consists of grains of an anion exchange material having a high capacity to swell or contains such material for instance in the form of a mixture of an anion exchange material with a cation exchange material. The separator layer is formed between the negative electrode and the depolarizer.

It is sufficient in general if the anion exchange compound can absorb water to an extent of three times its dry weight. However, it is preferred that this factor amount to between 5 and 15.

The size of the grains of the cation exchange material should preferably not be in excess of 200 microns in order to cause the layer not to become too thick and to increase the danger of pitting. The preferred grain size is between 15 and 70 microns in diameter. In a preferred embodiment a binding agent is added to the grains of the layer so as to form a structurally coherent dense separator body.

Heretofore anion exchange compounds had been considered unsuitable for this type of separator layer as it has been proposed in the earlier application referred to above. The reason was that a marked rising of the electrolyte occurred when an electric cell in which an anion exchange compound in granular form and with a good swelling property had been used as separator layer whenever the element was subjected to an electrical short-circuit. Upon further investigation of this phenomenon, it was however discovered that only small amounts of electrolyte were caused to rise during the initial period of operation, that is during a period between about 2 and 5 minutes while after that the electrolyte was again entirely absorbed by the depolarizer mass. Electrochemically this behavior of the electrolyte manifests itself in the fact that the voltage of the charged cell initially appears to be lower than in case of a cell that has a separator layer of cation exchange grains. What actually happens, however, is that the voltage at first rises, then decreases and then reaches a critical turning point where the values are practically the same as for cation exchange compounds.

A similar phenomenon can be established also when the short circuit current is measured which initially starts with a low value, upon further charging however goes down more slowly than with other electric cells used for comparison.

Apart from these initial differences in behaviour the two types of compounds are equally well suited to form separator layers in leak-proof electric cells. Both the anion and the cation exchange type layers are particularly beneficial when zinc chloride is used as the electrolyte. The thus-equipped primary elements remain dry even though the cup electrode has already suffered perforations.

The use of anion exchange materials for the separator may be important in connection with the problem of passivating the zinc anode, for instance, in case of special electrolyte conditions and discharge developments. In these cases it may be desirable to have anion exchange properties in the separator layer, for instance to eliminate the passivation of the zinc electrode by Cl− ions.

In these cases it may be desirable also to use a mixture of anion and cation exchange compounds. Since the cation exchange compounds are cheaper the mixture may therefore have economic advantages. The mixture may also permit to obtain a better wetting of the anode thus improving the performance of the cell. The admixture of cation exchangers should be effected in an amount, expressed in weight percent of the cation exchange compounds only up to below the following ratio:

$$\frac{100 \cdot \text{exchange capacity per gram of anion exchanger}}{\text{exchange capacity per gram of anion exchanger} + \text{that of cation exchanger}}$$

Good results are for instance obtained with a mixture of 20% of cation exchanger and 80% of anion exchanger. The reverse ratio of 80% of cation exchanger and 20% of anion exchanger does not result in any particularly desirable feature.

The preferred anion exchange compounds are those which have quaternary ammonium groups as the active groups and a matrix of a slightly cross-linked polymeric material such as a polycondensation resin of an arylpolyamine or an aliphatic polyamine or a polyalkylene polyamine, for instance polyethyleneimine, with an aldehyde, a saccharide, an alkyl polyhalide or an alpha-halogeno-beta,gamma-epoxy compound such as epichloro hydrin.

The alkylation of the amino groups to quaternary ammonium groups can be effected, for instance, with dimethylsulfate or with an alkylmonohalide.

The preferred material for the matrix of the anion exchange compound is a styrene-divinylbenzene copolymer which is subjected to chloromethylation and subsequent reaction with tertiary amines to introduce the quaternary ammonium groups. Likewise, polyvinylchloroalkylethers that have been cross-linked with divinylbenzene and subsequently reacted with tertiary amine may be used as the anion exchange compounds. Reference is made in this connection to the book by F. Helfferich, "Ionenaustauscher," vol. I (1959) pages 41–52.

If a mixture of anion and cation exchange compounds is used, the cation exchange compound may have the same polymeric matrix of a divinylbenzene cross-linked styrene but the active groups in that case would be sulfonate groups instead of the quaternary ammonium groups (cross-linked Na-polystyrene sulfonate).

Suitable binding agents are butadiene-acrylonitrile copolymers, vinyl chloride-vinyl acetate copolymers, polystyrene, polyvinylmethylether, polyvinylpyrrolidone vinylchloride-vinylpyrrolidone copolymers, polethyleneglycol (molecular weight higher than 1000).

The amount of binding agent will be determined by the specific agent employed and its properties. Preferably, the amount of binding agent should be between 10 and 20% by weight of the ion exchange material.

In the drawing, FIG. 1, the great similarity of the properties of anion exchange compound layers and cation exchange compound layers has been illustrated by tracing the voltage values against time in case of a continuous discharge with a resistance of 4 ohms. The two cells employed for this test were entirely identical except that in one cell an anion exchange compound was used and in the other a cation exchange compound was employed. The anion exchange compound was a polystyrene cross-linked with less than 3 mol percent of divinylbenzene and having active groups constituted by quaternary ammonium groups. The cation exchange compound was of the same type except that the active groups were sulfonated groups; to wit the compound was a cross-linked Na-polystyrene sulfonate.

Both the anion and cation exchange materials must have a good but somewhat limited swelling property which, for instance in case of synthetic organic ion exchange compounds is obtained by the space arrangement of the atoms due to the cross-linking action. This property of the separator layers apparently has the effect that the excess electrolyte retains a good flowability and is thus easily received in the capillaries of the depolarizer mass. This distinguishes the separator layers of the present invention and of the earlier above-referred-to aplication from the conventional thickeners or decomposed separator materials which result in highly viscous electrolytes.

If mixtures of anion and cation exchange compounds are used, it is possible to control the differences in the initial behavior of the primary elements by adjusting the ratio of anion to cation exchange compounds.

The preferred electric cell of the invention includes zinc as the electrode material and zinc chloride as the electrolyte.

The following example will further illustrate the invention. In this example an onion exchange compound was used which consisted of a styrene polymer that had been cross linked with 0.5 mol percent of divinylbenzene and contained quaternary ammonium exchange groups as the active groups. The exchange material had a particle size between 20 and 50μ. 5 g. of this dry, pulverulent anion exchange compound were added to 5 g. of acetone and thereafter 4 g. of a 20% solution of a binding agent consisting of a butadiene acrylonitrile copolymerisate were introduced into the mass.

The electric cell then was formed in a manner which is illustrated by FIG. 2 of the drawing. A small amount of the suspension formed as just described, that is 1 ml. was sprayed onto the interior wall of a rotating zinc cup which had a utilizable cylinder surface of 43 cm.$^2$ and a cylinder thickness of 0.45 mm. After the rapid evaporation of the solvent, there was formed a uniform firmly adhering separator coating 2 on the interior wall of the zinc cup.

To produce the completed cell, the bottom of the thus-coated cup was then covered with a disk 3 of synthetic material and a depolarizer mass 4 was directly pressed into the interior of the cup, or it could also have been inserted as a pre-shaped pressed body. The depolarizer body was then covered at its upper end with an annular disk 6 of a synthetic fiber fleece whereupon a carbon rod 5 was inserted into the depolarizer body. Thereby the depolarizer mass was firmly and uniformly pressed against the separator coating 2.

The cell was then closed in conventional manner by a packing 7 and a terminal cap 8.

The expansion space provided in conventional cells could be dispensed with in this case, with the exception of the provision of a relatively small space to permit accommodation of the depolarizer body which, within established tolerances, may have slight variations in size.

The depolarizer used in this example had the following composition.

| | Wt.-parts |
|---|---|
| Manganese dioxide | 87 |
| Carbon black | 13 |
| Zinc oxide | 0.5 |
| 30% concentration zinc chloride solution (density 1.29) | 70 |

The thus formed electric cell was completely leakproof even under conditions of great stress, for instance in case of an electrical circuit resulting in complete discharge. No liquid escaped from the element even under these particularly strenuous conditions.

EXAMPLES 2–4

The following examples will illustrate electric cells in which mixtures of anion and cation exchange compounds were used. The anion exchange compounds were the same as described in Example 1. The cation exchange compounds consisted of a cross-linked Na-polystyrenesulfonate as referred to.

The following mixtures were used:

Ex. 2: 95% of anion exchange compound and 5% of cation exchange compound
Ex. 3: 80% of anion exchange compound and 20% of cation exchange compound
Ex. 4: 55% of anion exchange compound and 45% of cation exchange compound The exchange capacity of the anion exchange compound in these cases was 4.4 mval./g. and the exchange capacity of the cation exchange compound was 5.3 mval./g.

All electric cells made with these mixtures showed more or less the same type of complete leak-proofness as exhibited by the cell described in Example 1.

The usual additional structure features which are necessary in conventional electric cells to prevent leaking, such as use of absorbent materials or use of steel or plastic envelopes can be dispensed with in the electric cells of the invention.

Likewise the volume of the expansion space for the electrolyte can be drastically reduced as already indicated in favour of more electrical capacity.

In addition there is still a further advantage when the cells of the invention are compared with the prior art elements in which a paper lining was used or which had a thickening agent of for instance starch and methylcellulose. The cells of the invention have a capacity yield which is higher by about 15 to 25% in case of harsh continuous discharges. The reason for this is that during the discharge no electrolyte solution is withdrawn from the depolarizer body.

With the cell of the invention and the particular thickener or, rather, separator layer, the capacity yield, the short-circuit current and the storability of the cells are strongly influenced by the swelling properties and thus the degree of cross linking and the exchange capacity of the exchange material that has been used; see the above-cited book by Helfferich, pages 92–96.

The criterion for the usefulness of an anion exchanger of the invention may therefore be found, apart from the cross-linking degree which is not easily determined, in the water content $W°$ of the exchanger that is in equilibrium with distilled water and charged with $Cl^-$ ions and also in the total weight capacity GK. The water content $W°$ is defined as gram water per one gram dry weight of the exchanger that has been charged with $Cl^-$ ions.

The total weight capacity GK is equal to the quotient as follows:

$$\frac{\text{the reagent consumed during titration in mval.}}{\text{dry weight of specimen in grams}}$$

All anion exchange compounds which have high swelling properties and are not easily oxidizable may be used. As already stated repeatedly, the preferred compound is based on a cross-linked polystyrene matrix. The water content indicating the swelling properties of the preferred material should be $W°$ no less than 3 and the weight capacity GK should be no less than 2 mval./g. This requirement is met by the described anion exchange material consisting of styrene and divinyl-benzene with ring-attached substituents comprising quaternary ammonium compounds wherein the degree of cross-linking amounts to less than 3 mol-percent divinylbenzene.

What is claimed is:

1. A leak-proof galvanic cell comprising a positive and a negative electrode, an electrolyte, a depolarizer and a structurally coherent separator film formed on the surface of the negative electrode and disposed in immediate contact throughout its surface with the negative electrode and the depolarizer, the said film comprising at least one swellable anion exchange compound having a water-absorption capacity equal to at least three times its dry weight, said anion exchange compound being in the form of grains of a size up to 200 microns and said grains being joined together by a binding agent to form said structurally coherent film.

2. The electric cell of claim 1, wherein the anion exchange compound has a water absorption capacity equal to between 5 and 15 times its dry weight.

3. The electric cell of claim 1, wherein the grain size of the anion exchange compound is between 15 and 70 microns.

4. The electric cell of claim 1, wherein the anion exchange compound is constituted by divinylbenzene cross-linked styrene having ring-attached quaternary ammonium groups as the active groups and wherein the degree of cross-linking is below 3 mol percent of divinylbenzene.

5. The leak-proof electric cell of claim 1, wherein the separator layer consists of a mixture of an anion and a cation exchange compound in granular form.

6. The electric cell of claim 5, wherein between 5 and 50 wt. percent of cation exchange compound are present relative to the weight of the anion exchange compound.

7. The electric cell of claim 1, wherein the amount of binding agent is between 10 and 20% relative to the weight of the ion-exchange compound.

8. The electric cell of claim 1, wherein the negative electrode is a zinc electrode and the electrolyte is zinc chloride.

9. The leak-proof galvanic cell described in claim 1 which includes 10 to 20 weight percent of a binding agent in the composition of the separator layer.

10. A leak-proof galvanic cell comprising a positive electrode, a negative electrode in the form of a zinc cup, an electrolyte, a depolarizer body provided in said zinc cup, and a structurally coherent separator film formed on the interior wall of said zinc cup, the said film being contiguous to and in direct contact throughout its surface with said depolarizer body, said separator film comprising at least one swellable anion exchange compound having a water-absorption capacity equal to at least 3 times its weight, said anion exchange compound being in the form of grains of a size up to 200 microns and said grains being joined together by an organic binding agent to form said structurally coherent film.

11. The galvanic cell of claim 10 wherein the anion exchange compound has a water-absorption capacity equal to between 5 and 15 times its dry weight.

12. The galvanic cell of claim 10 wherein the grain size of the anion exchange compound is between 15 and 70 microns.

References Cited
UNITED STATES PATENTS

| | | | |
|---|---|---|---|
| 2,229,431 | 1/1941 | Young | 136—111 |
| 2,366,007 | 12/1944 | D'Alelio | 210—24 |
| 2,607,809 | 8/1952 | Pitzer | 136—83 |
| 2,786,088 | 3/1957 | Robinson | 136—83 |
| 2,913,511 | 11/1959 | Grubb, Jr. | 136—86 |

ALLEN B. CURTIS, Primary Examiner

A. SKAPARS, Assistant Examiner

U.S. Cl. X.R.

136—107, 146